(12) United States Patent
Liu et al.

(10) Patent No.: US 12,730,008 B2
(45) Date of Patent: Sep. 8, 2026

(54) SENSING DEVICE

(71) Applicant: InnoLux Corporation, Miao-Li County (TW)

(72) Inventors: Yu-Tsung Liu, Miao-Li County (TW); I-An Yao, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 201 days.

(21) Appl. No.: 18/794,273

(22) Filed: Aug. 5, 2024

(65) Prior Publication Data

US 2025/0076123 A1 Mar. 6, 2025

(30) Foreign Application Priority Data

Sep. 4, 2023 (CN) ......................... 202311129685.5

(51) Int. Cl.

| | |
|---|---|
| ***G01J 5/02*** | (2022.01) |
| ***G01J 5/0801*** | (2022.01) |
| ***G01J 5/20*** | (2006.01) |
| ***G01J 5/58*** | (2022.01) |

(52) U.S. Cl.

CPC ............. *G01J 5/023* (2013.01); *G01J 5/0205* (2013.01); *G01J 5/0801* (2022.01); *G01J 5/20* (2013.01); *G01J 5/58* (2013.01); *G01J 2005/202* (2013.01)

(58) Field of Classification Search

CPC .... G01J 5/02; G01J 5/0801; G01J 5/20; G01J 5/58; G01J 5/0205; G01J 5/023; G01J 2005/202; G01D 5/12; H10W 42/60

See application file for complete search history.

(56) References Cited

U.S. PATENT DOCUMENTS

| | | | |
|---|---|---|---|
| 10,222,265 B2 * | 3/2019 | Chan ......................... | G01J 5/40 |
| 2012/0132804 A1 | 5/2012 | Lee et al. | |

* cited by examiner

*Primary Examiner* — Jurie Yun

(74) *Attorney, Agent, or Firm* — MUNCY, GEISSLER, OLDS & LOWE, P.C.

(57) ABSTRACT

A sensing device is provided, which comprises: a substrate; a circuit layer disposed on the substrate, the circuit layer comprising a switch element; a reflector disposed on the circuit layer, the reflector comprising a first reflection part and a second reflection part separated from each other, wherein the first reflection part is electrically connected to the switch element, and the second reflection part receives a voltage; and a sensing element disposed on the reflector, the sensing element separated from the reflector by a gap, wherein the sensing element comprises a first absorbing part, a second absorbing part and a sensing part disposed on the first absorbing part and the second absorbing part; wherein in a normal direction of the sensing device, the first absorbing part and the second reflection part are not overlapped, and the second absorbing part and the first reflection part are not overlapped.

19 Claims, 5 Drawing Sheets

SENSING DEVICE

CROSS-REFERENCE TO RELATED APPLICATIONS

This application claims the benefits of the Chinese Patent Application Ser. No. 202311129685.5, filed on Sep. 4, 2023, the subject matter of which is incorporated herein by reference.

BACKGROUND

Field

The present disclosure is related to a sensing device. More specifically, the present disclosure is related to a sensing device with a reflector.

Description of Related Art

The sensing device has the advantages of detection without contact with objects, high sensitivity, and high anti-noise characteristics. It can be used in object distance detection, temperature detection, human body detection, etc., and has high application value.

Generally, the bottom of the sensing layer in the sensing device can be designed as a suspended structure to reduce the impact of heat conduction on the sensing signal. However, an electrostatic field attraction may be generated between the sensing layer and the traces under the suspended structure, causing the sensing layer to tilt, leading to heat dissipation, and thus affecting the sensing signal and sensing effect.

Therefore, it is desirable to provide a sensing device to improve the conventional defects.

SUMMARY

The present disclosure provides a sensing device, comprising: a substrate; a circuit layer disposed on the substrate and comprising a switch element; a reflector disposed on the circuit layer and comprising a first reflection part and a second reflection part separated from each other, wherein the first reflection part is electrically connected to the switch element, and the second reflection part receives a voltage; and a sensing element disposed on the reflector and separated from the reflector by a gap, wherein the sensing element comprises a first absorbing part, a second absorbing part and a sensing part disposed on the first absorbing part and the second absorbing part, wherein, in the normal direction of the sensing device, the first absorbing part and the second reflection part are not overlapped, and the second absorbing part and the first reflection part are not overlapped.

Other novel features of the disclosure will become more apparent from the following detailed description when taken in conjunction with the accompanying drawings.

DETAILED DESCRIPTION

Figure 1:
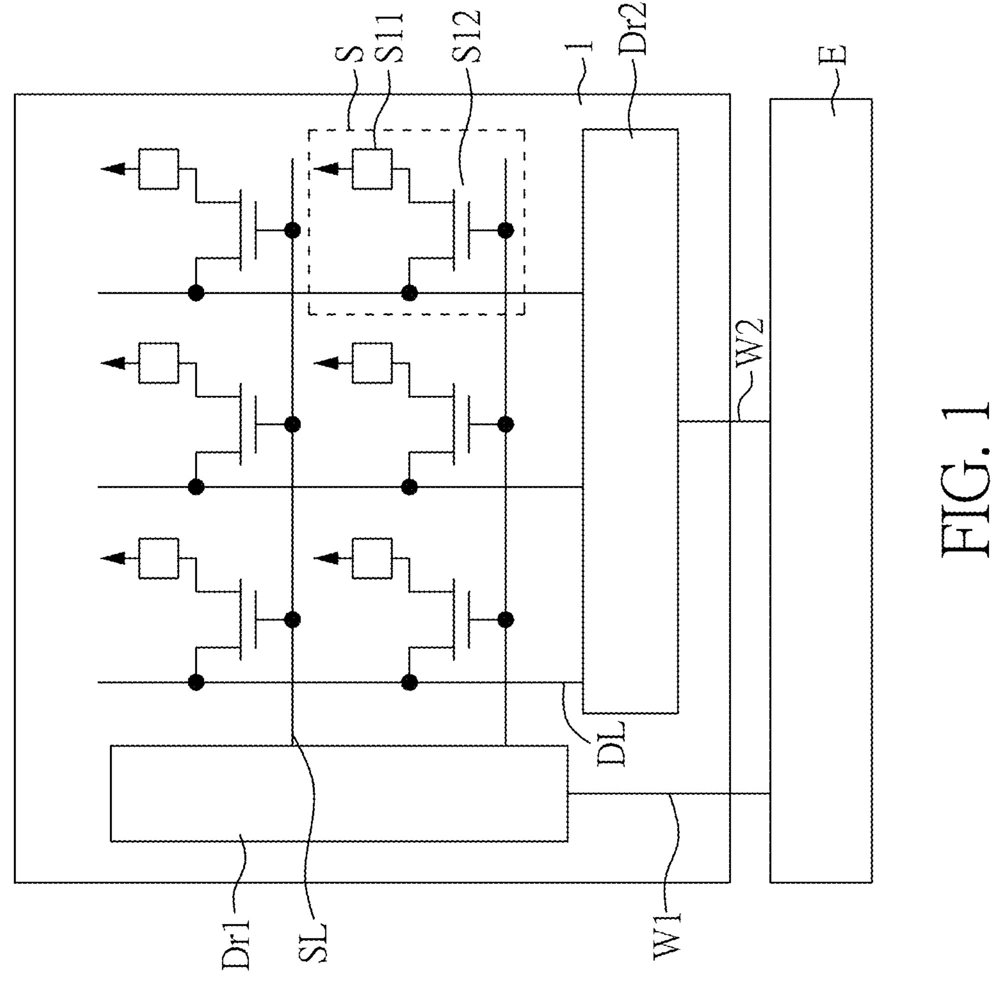
FIG. 1 is an equivalent circuit diagram of a sensing device according to one embodiment of the present disclosure.

The following is specific embodiments to illustrate the implementation of the present disclosure. Those who are familiar with this technique can easily understand the other advantages and effects of the present disclosure from the content disclosed in the present specification. The present disclosure can also be implemented or applied by other different specific embodiments, and various details in the present specification can also be modified and changed according to different viewpoints and applications without departing from the spirit of the present disclosure.

It should be noted that, in the present specification, when a component is described to have an element, it means that the component may have one or more of the elements, and it does not mean that the component has only one of the element, except otherwise specified. Furthermore, the ordinals recited in the specification and the claims such as “first”, “second” and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation.

In the specification and the appended claims of the present disclosure, certain words are used to refer to specific elements. Those skilled in the art should understand that electronic device manufacturers may refer to the same components by different names. The present specification does not intend to distinguish between elements that have the same function but have different names. In the following description and claims, words such as “comprising”, “including”, “containing”, and “having” are open-ended words, so they should be interpreted as meaning “containing but not limited to . . . ”. Therefore, when the terms “comprising”, “including”, “containing” and/or “having” are used in the description of the present disclosure, they specify the existence of corresponding features, regions, steps, operations and/or components, but do not exclude the existence of one or more corresponding features, regions, steps, operations and/or components.

The terms, such as “about”, “equal to”, “equal” or “same”, “substantially”, or “approximately”, are generally interpreted as within 10%, 5%, 3%, 2%, 1%, or 0.5% of a given value or range. The quantity given here is an approximate quantity, that is, without specifying “about”, “approximately”, “substantially” and “approximately”, “about”, “approximately”, “substantially” and “approximately” can still be implied. Furthermore, when a value is “in a range from a first value to a second value” or “in a range between a first value and a second value”, the value can be the first value, the second value, or another value between the first value and the second value.

In the present specification, except otherwise specified, the terms (including technical and scientific terms) used herein have the meanings generally known by a person skilled in the art. It should be noted that, except otherwise specified, in the embodiments of the present disclosure, these terms (for example, the terms defined in the generally used dictionary) should have the meanings identical to those known in the art, the background of the present disclosure or the context of the present specification, and should not be read by an ideal or over-formal way.

In addition, relative terms such as "below" or "under" and "on", "above" or "over" may be used in the embodiments to describe the relative relationship between one element and another element in the drawings. It will be understood that if the device in the drawing was turned upside down, elements described on the "lower" side would then become elements described on the "upper" side. When a unit (for example, a layer or a region) is referred to as being "on" another unit, it can be directly on the another unit or there may be other units therebetween. Furthermore, when a unit is said to be "directly on another unit", there is no unit therebetween. Moreover, when a unit is said to be "on another unit", the two have a top-down relationship in a top view, and the unit can be disposed above or below the another unit, and the top-bottom relationship depends on the orientation of the device.

In the present disclosure, any two values or directions used for comparison may have certain errors. If the first value is equal to the second value, it implies that there may be an error of about 10% between the first value and the second value. If the first direction is perpendicular to the second direction, the angle between the first direction and the second direction may be between 80° and 100°. If the first direction is parallel to the second direction, the angle between the first direction and the second direction may be between 0° and 10°.

It should be noted that the technical solutions provided by different embodiments hereinafter may be replaced, combined or used in combination, so as to constitute another embodiment without violating the spirit of the present disclosure.

FIG. 1 is an equivalent circuit diagram of a sensing device according to one embodiment of the present disclosure.

In one embodiment of the present disclosure, as shown in FIG. 1, the sensing device may comprise: a substrate 1; a plurality of sensors S disposed on the substrate 1; and drivers Dr1, Dr2 disposed on the substrate 1, wherein the drivers Dr1, Dr2 are electrically connected to the sensors S respectively.

More specifically, as shown in FIG. 1, each sensor S may comprise: a sensing element S11 used to sense light within a wavelength range; and a switch element S12 electrically connected to the sensing element S11. The drivers Dr1, Dr2 may be electrically connected to the switch element S12 in each sensor S through the scan lines SL and the data lines DL respectively to transmit or receive signals to achieve the purpose of sensing. For example, the driver Dr1 may transmit control signals through the scan lines SL respectively to control the sensor S; or the driver Dr2 may receive the sensing signals generated by the sensor S through the data lines DL respectively. Therefore, in the present disclosure, the substrate 1 and the elements thereon may form a sensing array substrate.

In the present disclosure, as shown in FIG. 1, the sensing device may further comprise an electronic element E electrically connected to the drivers Dr1, Dr2 respectively. More specifically, the electronic element E may be electrically connected to the driver Dr1 through the conductive line W1, and electrically connected to the driver Dr2 through the conductive line W2, for example, to control or process the signal transmitted to the driver Dr1 or receive the signal from the driver Dr2. In one embodiment of the present disclosure, the electronic element E may be an integrated circuit (IC), but the present disclosure is not limited thereto. In addition, although one driver Dr1 and one driver Dr2 are present as an example in FIG. 1, the sensing device may comprise a plurality of drivers Dr1 and/or a plurality of driver Dr2 in other embodiments of the present disclosure, which may be electrically connected to the electronic element E through a plurality of conductive lines W1 and/or a plurality of conductive lines W2 respectively.

Figure 2A:
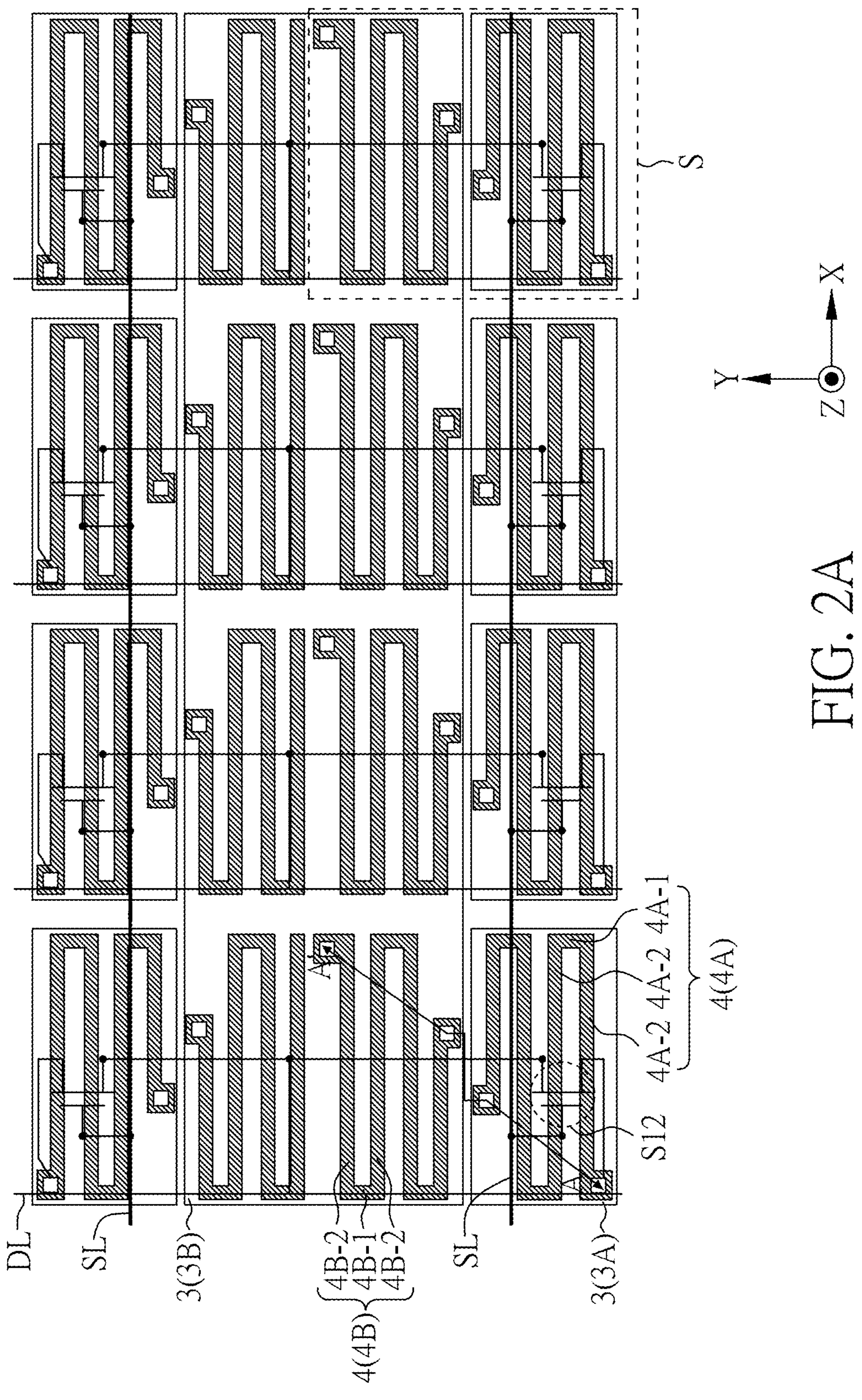
FIG. 2A is a schematic top view of part of a sensing device according to one embodiment of the present disclosure.
Figure 2B:
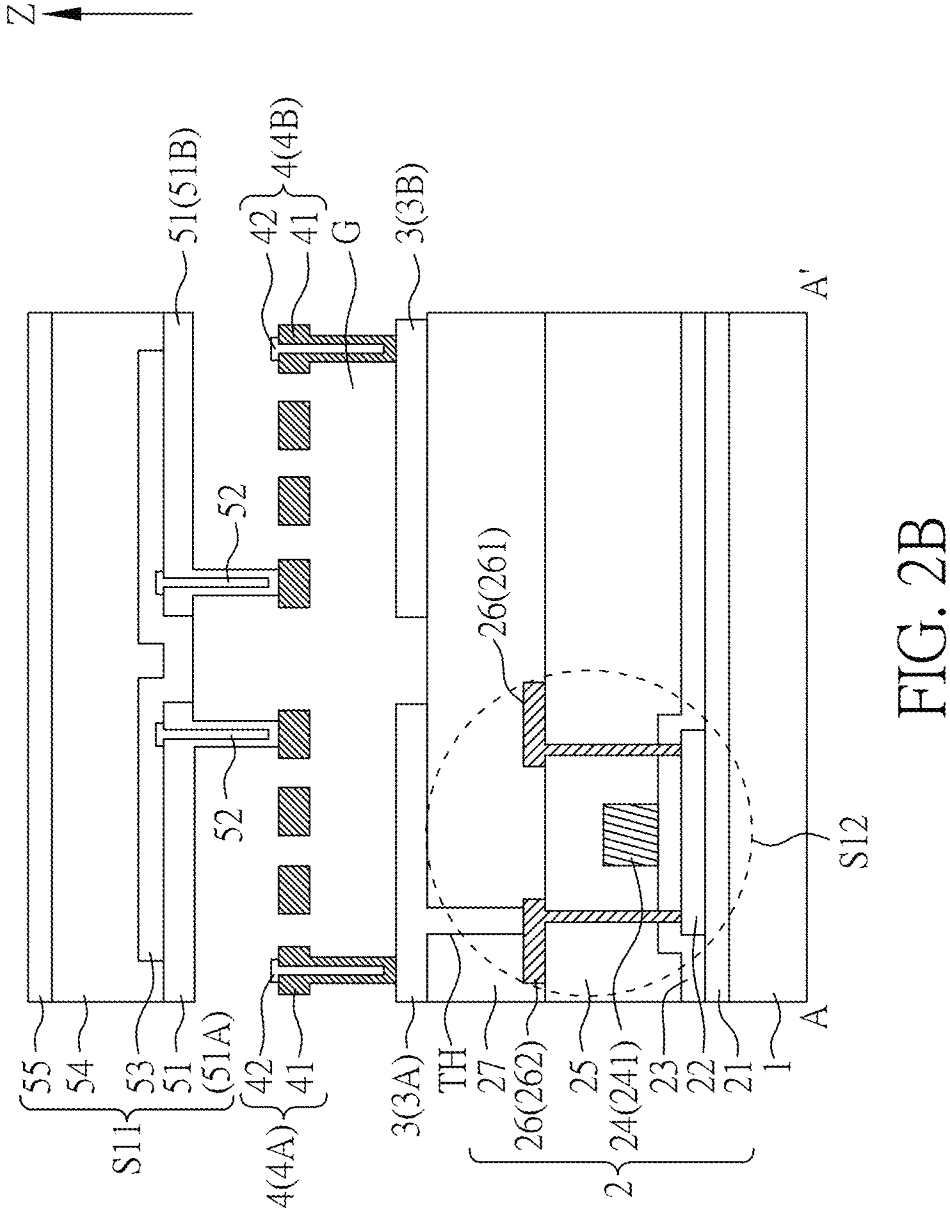
FIG. 2B is a schematic cross-sectional view of the line A-A' in FIG. 2A.

FIG. 2A is a schematic top view of part of a sensing device according to one embodiment of the present disclosure. FIG. 2B is a schematic cross-sectional view of the line A-A' in FIG. 2A. For convenience of explanation, some elements (such as sensing elements) are not shown in FIG. 2A.

In one embodiment of the present disclosure, as shown in FIG. 2A and FIG. 2B, the sensing device may comprise: a substrate 1; a circuit layer 2 disposed on the substrate 1, wherein the circuit layer 2 comprises a switch element S12; a reflector 3 disposed on the circuit layer 2, wherein the reflector 3 comprises a first reflection part 3A and a second reflection part 3B separated from each other, wherein the first reflection part 3A is electrically connected to the switch element S12, and the second reflection part 3B receives a voltage; and a sensing element S11 disposed on the reflector 3, wherein the sensing element S11 is separated from the reflector 3 by a gap G, wherein the sensing element S11 comprises a first absorbing part 51A, a second absorbing part 51B and a sensing part 54 disposed on the first absorbing part 51A and the second absorbing part 51B. In a normal direction Z of the sensing device, the first absorbing part 51A and the second reflection part 3B are not overlapped, and the second absorbing part 51B and the first reflection part 3A are not overlapped. In the present disclosure, by staggering the first absorbing part 51A and the second reflection part 3B and staggering the second absorbing part 51B and the first reflection part 3A, the electrostatic attraction generated between the absorbing part and the reflection part can be reduced, the heat dissipation phenomenon can be improved, and the sensing effect can be improved.

In one embodiment of the present disclosure, as shown in FIG. 2A and FIG. 2B, the circuit layer 2 may comprise: a buffer layer 21 disposed on the substrate 1; an active layer 22 disposed on the buffer layer 21; a first insulating layer 23 disposed on the active layer 22; a first metal layer 24 disposed on the first insulating layer 23, wherein the first metal layer 24 comprises a gate electrode 241 and a scan line SL, and the gate electrode 241 is electrically connected to the scan line SL; a second insulating layer 25 disposed on the first metal layer 24; a second metal layer 26 disposed on the second insulating layer 25, wherein the second metal layer 26 comprises a source electrode 261, a drain electrode 262 and a data line DL, and the source electrode 261 is electrically connected to the data line DL; and a third insulating layer 27 disposed on the second metal layer 26. Herein, the active layer 22, the first insulating layer 23, the gate electrode 241, the second insulating layer 25, the source electrode 261 and the drain electrode 262 form the switch element S12.

In one embodiment of the present disclosure, as shown in FIG. 2A and FIG. 2B, the reflector 3 is disposed on the third insulating layer 27. The first reflection part 3A of the reflector 3 may be electrically connected to the drain electrode 262 through a via TH of the third insulating layer 27. The second reflection part 3B of the reflector 3 may be electrically connected to an external power supply (not shown in the figure) to provide a voltage to the sensing device. In one embodiment of the present disclosure, the voltage may be a common voltage. In addition, in the present disclosure, the reflector 3 may be used to reflect light to the sensing element S11 (for example, the absorption layer 51) to increase the utilization rate of light and improve the sensing effect.

In one embodiment of the present disclosure, as shown in FIG. 2A and FIG. 2B, the sensing device may comprise: a supporting layer 41 disposed on the reflector 3; and a third metal layer 42 disposed on the supporting layer 41, wherein the supporting layer 41 and the third metal layer 42 may form the supporting element 4 to support the sensing element S11 thereon. Thus, the sensing device may further comprise: a supporting element 4 disposed between the reflector 3 and the sensing element S11, wherein the supporting element 4 comprises a first supporting part 4A and a second supporting part 4B separated from each other, wherein the first supporting part 4A connects the first absorbing part 51A of the sensing element S11 and the first reflection part 3A of the reflector 3, and the second supporting part 4B connects the second absorbing part 51B of the sensing element S11 and the second reflection part 3B of the reflector 3. In more detail, the first supporting part 4A is electrically connected to the first absorbing part 51A and the first reflection part 3A respectively, and the second supporting part 4B is electrically connected to the second absorbing part 51B and the second reflection part 3B respectively. In the present disclosure, as shown in FIG. 2B, a gap G is formed between the sensing element S11 and the reflector 3 by the supporting layer 41. The gap G may be formed by setting sacrificial layers between the reflector 3 and the supporting element 4 respectively, followed by removing the sacrificial layers. The gap G may be used to prevent heat conduction which may affect the sensing signal.

In one embodiment of the present disclosure, as shown in FIG. 2B, the sensing device may further comprise: an absorbing layer 51 disposed on the supporting layer 41, wherein the absorbing layer 51 comprises a first absorbing part 51A and a second absorbing part 51B; a fourth metal layer 52 disposed on the absorbing layer 51; a first passivation layer 53 disposed on the absorbing layer 51 and the fourth metal layer 52; a sensing part 54 disposed on the first passivation layer 53; a second passivation layer 55 disposed on the sensing part 54, wherein the absorbing layer 51, the fourth metal layer 52, the first passivation layer 53, the sensing part 54 and the second passivation layer 55 forms the sensing element S11. In the present disclosure, light in a specified wavelength range can be absorbed by the absorbing layer 51 to generate heat, the heat is transferred to the sensing part 54 through the fourth metal layer 52 and the first passivation layer 53, the resistance of the sensing part 54 changes with the thermal change to form an electrical signal, so that the sensing element S11 can achieve the purpose of sensing light in the specified wavelength range. In the present disclosure, the specified wavelength range may range from 8 μm to 14 μm, but the present disclosure is not limited thereto.

In the present disclosure, the substrate 1 may be a rigid substrate or a flexible substrate. The material of the substrate 1 may comprise quartz, glass, wafer, sapphire, resin, epoxy resin, polycarbonate (PC), polyimide (PI), polypropylene (PP), polyethylene terephthalate (PET), polymethylmethacrylate (PMMA), other plastic materials or a combination thereof, but the present disclosure is not limited thereto. In the present disclosure, the materials of the buffer layer 21, the first insulating layer 23, the second insulating layer 25 and the third insulating layer 27 may be the same or different, wherein the materials of the buffer layer 21, the first insulating layer 23, the second insulating layer 25 and the third insulating layer 27 may respectively comprise silicon nitride, silicon oxide, silicon oxynitride, silicon carbonitride or a combination thereof, but the present disclosure is not limited thereto. In the present disclosure, the material of the active layer 22 may comprise amorphous silicon, polycrystalline silicon (such as low-temperature polycrystalline silicon (LTPS)), or oxide semiconductors (such as indium gallium zinc oxide (IGZO)), but the present disclosure is not limited thereto. In the present disclosure, the materials of the first metal layer 24, the second metal layer 26 and the reflector 3 may be the same or different, wherein the materials of the first metal layer 24, the second metal layer 26 and the reflector 3 may respective comprise gold, silver, copper, palladium, platinum (Pt), ruthenium (Ru), aluminum, cobalt, nickel, titanium, molybdenum (Mo), manganese, zinc, an alloy thereof or a combination thereof, but the present disclosure is not limited thereto.

In the present disclosure, the material of the supporting layer 41 may comprise titanium nitride (TiN), titanium aluminide (TiAl), titanium aluminum nitride (TiAlN), titanium aluminum oxide (TiAlO), titanium silicon aluminum (TiSiAl), titanium tungsten (TiW), titanium tungsten nitride (TiWN), aluminum nitride (AlNx) or a combination thereof, but the present disclosure is not limited thereto. In the present disclosure, the materials of the third metal layer 42 and the fourth metal layer 52 may be the same or different, wherein the materials of the third metal layer 42 and the fourth metal layer 52 may respectively comprise molybdenum (Mo), molybdenum nitride (MoN), molybdenum tungsten (MoW), tungsten (W) or a combination thereof, but the present disclosure is not limited thereto. In the present disclosure, the material of the absorbing layer 51 may comprise titanium, titanium nitride (TiN), platinum, gold, nickel, niobium (Nb), an alloy thereof or a combination thereof, but the present disclosure is not limited thereto. In the present disclosure, the materials of the first passivation layer 53 and the second passivation layer 55 may be the same or different, wherein the materials of the first passivation layer 53 and the second passivation layer 55 may respectively comprise silicon oxide, silicon oxynitride, silicon nitride, aluminum oxide, resin, polymer, photoresist material or a combination thereof, but the present disclosure is not limited thereto. In the present disclosure, the material of the sensing part 54 may comprise amorphous silicon, vanadium oxide (VOx), yttrium barium copper oxide (YBaCuO), silicon germanium oxide (GeSiO), silicon-germanium (SiGe), bismuth lanthanum strontium manganese oxide (BiLaSrMnO) or a combination thereof, but the present disclosure is not limited thereto. In one embodiment of the present disclosure, the sensing part 54 comprises a thermal sensitive resistor, but the present disclosure is not limited thereto.

In one embodiment of the present disclosure, as shown in FIG. 2A and FIG. 2B, in the normal direction Z of the sensing device, the first reflection part 3A and the second reflection part 3B are not overlapped, and the first supporting part 4A and the second supporting part 4B are not overlapped. In addition, as shown in FIG. 2A, observing from the normal direction Z of the sensing device, the first supporting part 4A may comprise a plurality of turning segments 4A-1 and a plurality of straight segments 4A-2 connecting to both ends of the plurality of the turning segments 4A-1. Similarly, the second supporting part 4B may also comprise a plurality of turning segments 4B-1 and a plurality of straight segments 4B-2 connecting to both ends of the plurality of turning segments 4B-1. Herein, the turning segments may respectively have a U shape, but the present disclosure is not limited thereto. When the first supporting part 4A and the second supporting part 4B have the aforesaid design, the heat dissipation phenomenon can be improved, thereby improving the sensing effect.

In one embodiment of the present disclosure, as shown in FIG. 2B, in the normal direction Z of the sensing device, the first absorbing part 51A and the switch element S12 are overlapped, and the second absorbing part 51B and the switch element S12 are not overlapped. More specifically, the first absorbing part 51A and the switch element S12 electrically connected thereto may be overlapped, and the second absorbing part 51B and the switch element S12 are not overlapped, but the present disclosure is not limited thereto. In one embodiment of the present disclosure, even not shown in the figure, in the normal direction Z of the sensing device, the first absorbing part 51A and the second absorbing part 51B may be respectively overlapped with the switch element S12, but the present disclosure is not limited thereto.

Figure 3A:
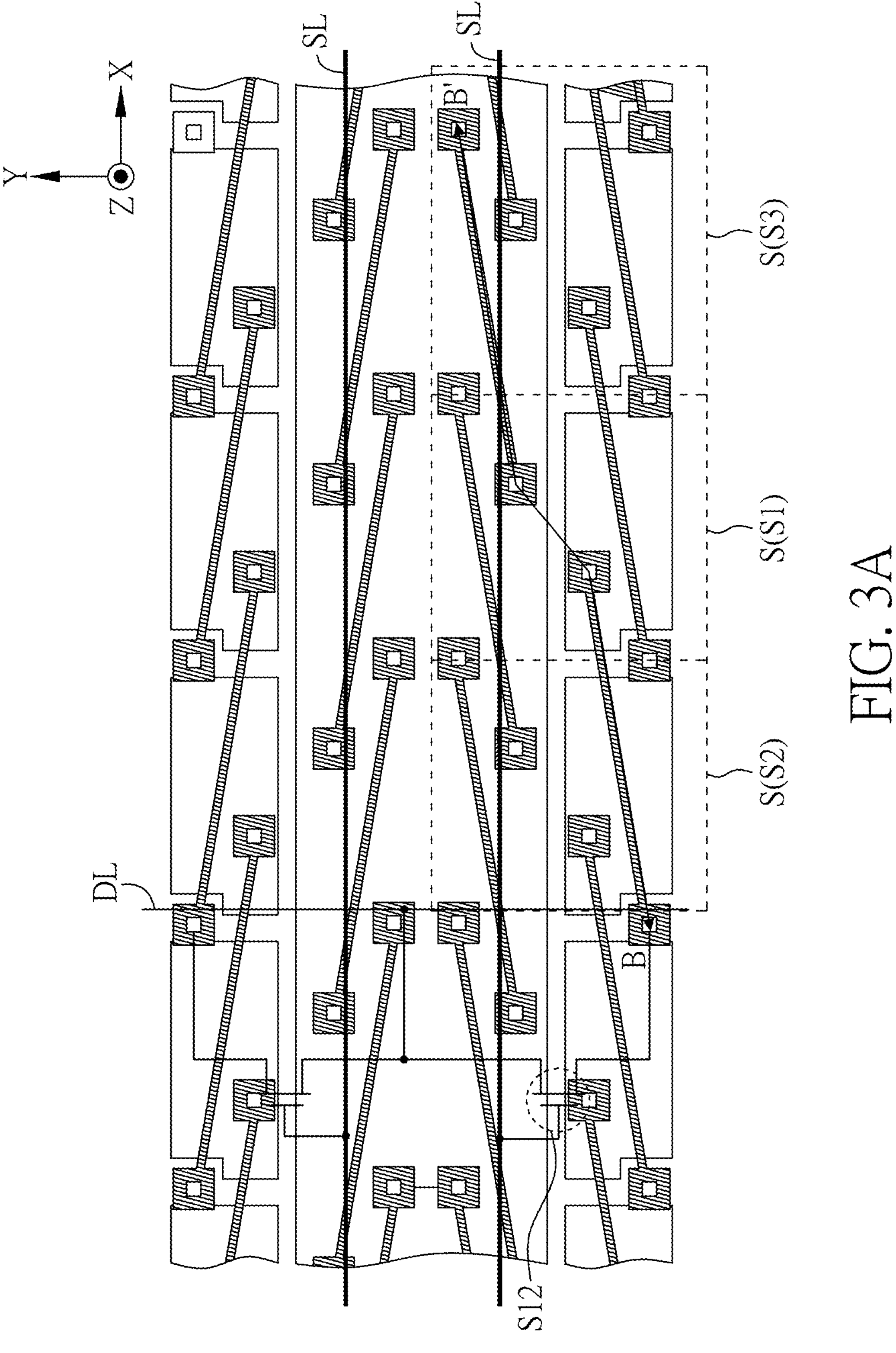
FIG. 3A is a schematic top view of part of a sensing device according to one embodiment of the present disclosure.
Figure 3B:
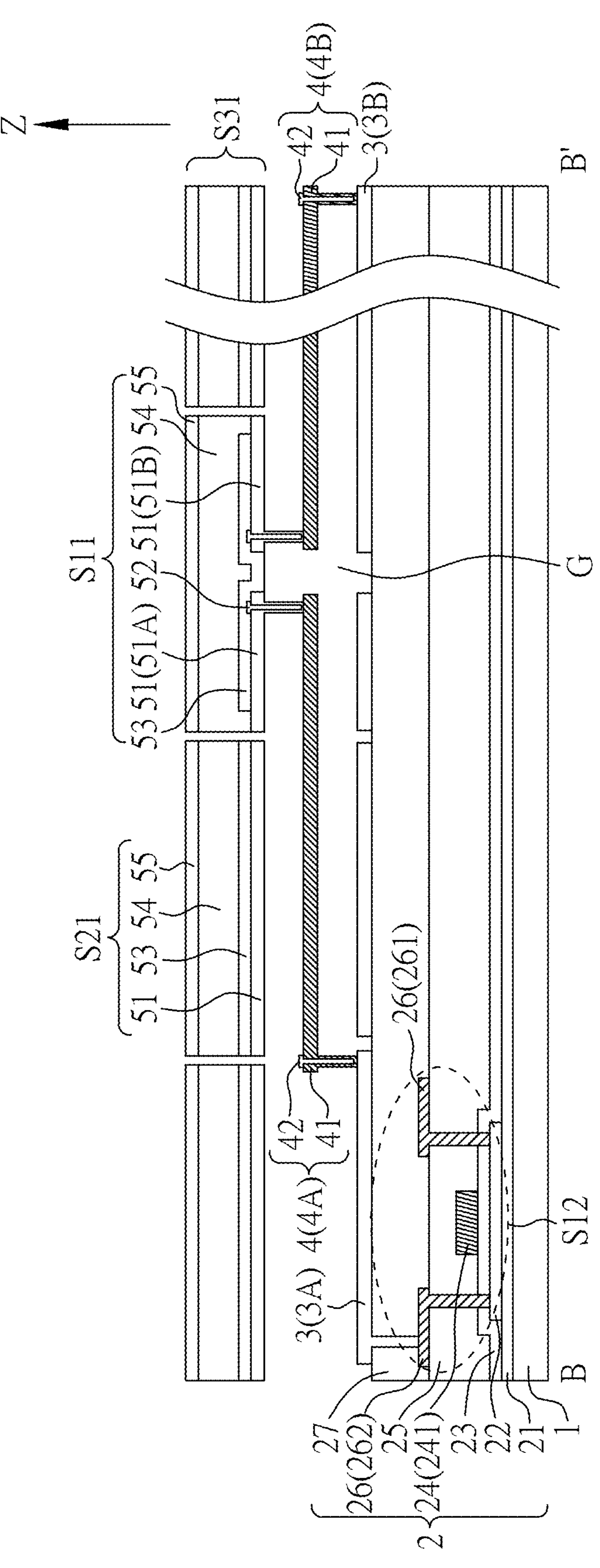
FIG. 3B is a schematic cross-sectional view of the line B-B' in FIG. 3A.

FIG. 3A is a schematic top view of part of a sensing device according to one embodiment of the present disclosure. FIG. 3B is a schematic cross-sectional view of the line B-B' in FIG. 3A. The sensing device in FIG. 3A is similar to that in FIG. 2A, except for the following differences. In addition, for convenience of explanation, some elements are not shown in FIG. 3A and FIG. 3B (for example, the sensing element is not shown in FIG. 3A, and part of the switch element is not shown in FIG. 3A and FIG. 3B).

In one embodiment of the present disclosure, as shown in FIG. 3A and FIG. 3B, the supporting element 4 may be disposed corresponding to a plurality of sensors S. In more detail, the sensing device may comprise a plurality of sensors S disposed adjacent to each other. For example, the sensing device may comprise: a sensor S1; and another sensor S2 disposed adjacent to the sensor S1. The sensor S1 may comprise a sensing element S11; and a switch element S12 electrically connected to the sensing element S11. Similarly, the sensor S2 may comprise another sensing element S21 disposed adjacent to the sensing element S11; and another switch element (not shown in the figure) electrically connected to the sensing element S21. In one embodiment of the present disclosure, as shown in FIG. 3B, in the normal direction Z of the sensing device, the first supporting part 4A may be overlapped with the sensing element S11 and the sensing element S21. Similarly, when the sensing device comprise another sensor (for example, the sensor S3), the second supporting part 4B may respectively be overlapped with the sensing elements S11, S31 in the normal direction Z of the sensing device. When the supporting element 4 has the aforesaid design, the heat dissipation phenomenon can be improved, thereby improving the sensing effect.

In one embodiment of the present disclosure, as shown in FIG. 3A and FIG. 3B, in the normal direction Z of the sensing device, the sensing element S11 and the switch element S12 electrically connected thereto are not overlapped. In other words, in one embodiment of the present disclosure, as shown in FIG. 3B, in the normal direction Z of the sensing device, the first absorbing part 51A and the switch element S12 electrically connected thereto are not overlapped.

The above specific examples are to be construed as illustrative only and not in any way limiting of the remainder of the disclosure.

Although the present disclosure has been explained in relation to its embodiment, it is to be understood that many other possible modifications and variations can be made without departing from the spirit and scope of the disclosure as hereinafter claimed.

The invention claimed is:

1. A sensing device, comprising:

a substrate;

a circuit layer disposed on the substrate and comprising a switch element;

a reflector disposed on the circuit layer and comprising a first reflection part and a second reflection part separated from each other, wherein the first reflection part is electrically connected to the switch element, and the second reflection part receives a voltage; and a sensing element disposed on the reflector and separated from the reflector by a gap, wherein the sensing element comprises a first absorbing part, a second absorbing part and a sensing part disposed on the first absorbing part and the second absorbing part, wherein, in the normal direction of the sensing device, the first absorbing part and the second reflection part are not overlapped, and the second absorbing part and the first reflection part are not overlapped.

2. The sensing device of claim 1, further comprising: a supporting element disposed between the reflector and the sensing element, wherein the supporting element comprises a first supporting part and a second supporting part separated from each other, wherein the first supporting part connects the first absorbing part and the first reflection part, and the second supporting part connects the second absorbing part and the second reflection part.

3. The sensing device of claim 2, wherein the first reflection part and the second reflection part are not overlapped, and the first supporting part and the second supporting part are not overlapped.

4. The sensing device of claim 2, wherein the first supporting part comprises a plurality of turning segments and a plurality of straight segments connecting to both ends of the plurality of turning segments.

5. The sensing device of claim 4, wherein the plurality of turning segments respectively have a U shape.

6. The sensing device of claim 2, wherein the second supporting part comprises a plurality of turning segments and a plurality of straight segments connecting to both ends of the plurality of turning segments.

7. The sensing device of claim 6, wherein the plurality of turning segments respectively have a U shape.

8. The sensing device of claim 2, further comprising another sensing element disposed adjacent to the sensing element, wherein the first supporting part and the another sensing element are overlapped in the normal direction of the sensing device.

9. The sensing device of claim 2, further comprising another sensing element disposed adjacent to the sensing element, wherein the second supporting part and the another sensing element are overlapped in the normal direction of the sensing device.

10. The sensing device of claim 2, wherein the supporting element comprises a supporting layer and a metal layer disposed on the supporting layer.

11. The sensing device of claim 1, wherein the circuit layer further comprises a scan line and a data line, and the switch element further comprises a gate electrode, a source electrode and a drain electrode, wherein the gate electrode is electrically connected to the scan line, the source electrode is electrically connected to the data line, and the drain electrode is electrically connected to the first reflection part.

12. The sensing device of claim 1, wherein the voltage is a common voltage.

13. The sensing device of claim 1, wherein the sensing part comprises a thermal sensitive resistor.

14. The sensing device of claim 1, wherein the first absorbing part and the switch element are overlapped in the normal direction of the sensing device.

15. The sensing device of claim 14, wherein the second absorbing part and the switch element are not overlapped in the normal direction of the sensing device.

16. The sensing device of claim 1, wherein the first absorbing part and the switch element are not overlapped in the normal direction of the sensing device.

17. The sensing device of claim 1, wherein the first absorbing part absorbs light in a specified wavelength range from 8 μm to 14 μm.

18. The sensing device of claim 1, wherein the sensing element comprises an absorbing layer and a metal layer disposed on the absorbing layer.

19. The sensing device of claim 18, wherein the sensing element further comprises a passivation layer disposed on the absorbing layer and the metal layer.

* * * * *